United States Patent
Wookey

(10) Patent No.: US 8,090,873 B1
(45) Date of Patent: Jan. 3, 2012

(54) METHODS AND SYSTEMS FOR HIGH THROUGHPUT INFORMATION REFINEMENT

(75) Inventor: Michael J. Wookey, Los Gatos, CA (US)

(73) Assignee: Oracle America, Inc., Redwood City, CA (US)

( * ) Notice: Subject to any disclaimer, the term of this patent is extended or adjusted under 35 U.S.C. 154(b) by 1392 days.

(21) Appl. No.: 11/080,839

(22) Filed: Mar. 14, 2005

(51) Int. Cl.
*G06F 15/16* (2006.01)

(52) U.S. Cl. ........ 709/246; 709/203; 707/600; 707/601; 707/602

(58) Field of Classification Search .................. 709/203, 709/246; 707/600–602
See application file for complete search history.

(56) References Cited

U.S. PATENT DOCUMENTS

| | | | |
|---|---|---|---|
| 5,247,647 A | 9/1993 | Brown et al. | |
| 5,386,570 A * | 1/1995 | Lindhorst | 717/146 |
| 5,765,033 A * | 6/1998 | Miloslavsky | 709/206 |
| 5,765,174 A | 6/1998 | Bishop | |
| 6,128,646 A * | 10/2000 | Miloslavsky | 709/206 |
| 6,314,427 B1 | 11/2001 | Goldman et al. | |
| 6,421,690 B1 | 7/2002 | Kirk, III | |
| 6,473,787 B2 * | 10/2002 | Miloslavsky | 709/206 |
| 6,829,745 B2 * | 12/2004 | Yassin et al. | 715/236 |
| 6,834,382 B2 * | 12/2004 | Marso et al. | 717/143 |
| 6,886,041 B2 * | 4/2005 | Messinger et al. | 709/226 |
| 6,886,115 B2 * | 4/2005 | Kondoh et al. | 714/52 |
| 6,886,166 B2 * | 4/2005 | Harrison et al. | 719/313 |
| 6,904,454 B2 | 6/2005 | Stickler | |
| 6,917,929 B2 * | 7/2005 | Teloh et al. | 1/1 |
| 6,920,476 B2 * | 7/2005 | McGann et al. | 709/201 |
| 6,952,666 B1 * | 10/2005 | Weise | 704/9 |
| 6,986,104 B2 * | 1/2006 | Green et al. | 715/234 |
| 7,062,706 B2 | 6/2006 | Maxwell et al. | |
| 7,111,075 B2 * | 9/2006 | Pankovcin et al. | 709/246 |
| 7,127,743 B1 * | 10/2006 | Khanolkar et al. | 726/23 |
| 7,246,104 B2 | 7/2007 | Stickler | |
| 7,391,735 B2 * | 6/2008 | Johnson | 370/246 |
| 7,395,497 B1 * | 7/2008 | Chaulk et al. | 715/200 |
| 7,450,617 B2 * | 11/2008 | Cheung et al. | 370/536 |
| 7,570,661 B2 * | 8/2009 | Miller et al. | 370/469 |
| 7,596,793 B2 * | 9/2009 | Grabarnik et al. | 719/318 |
| 7,720,432 B1 * | 5/2010 | Colby et al. | 455/3.02 |
| 7,747,587 B2 * | 6/2010 | Kubota et al. | 707/694 |
| 7,818,666 B2 * | 10/2010 | Dorsett et al. | 715/237 |
| 7,873,992 B1 * | 1/2011 | Daily et al. | 726/11 |
| 2002/0004796 A1 | 1/2002 | Vange et al. | |
| 2002/0035482 A1 | 3/2002 | Coble et al. | |
| 2002/0035617 A1 | 3/2002 | Lynch et al. | |
| 2002/0083210 A1 * | 6/2002 | Harrison et al. | 709/310 |
| 2002/0091736 A1 | 7/2002 | Wall | |
| 2002/0141449 A1 * | 10/2002 | Johnson | 370/473 |

(Continued)

*Primary Examiner* — Kamal B Divecha
(74) *Attorney, Agent, or Firm* — Marsh Fischmann & Breyfogle LLP; Kent A. Lembke

(57) ABSTRACT

Methods, systems, and articles of manufacture consistent with the present invention provide a data processing system comprising a business application that receives data messages from a plurality of client data sources. The business application comprises a message pre-processor and a parsing processor. The message pre-processor classifies and identifies the data messages and sends the messages in a structured format to a message queue corresponding to its data type. The parsing processor receives the data messages from the message queues and selects a parser by applying a set of parsing rules. The parsing rules apply information about the data message and provide a decision as to the best parsing engine to use out of a plurality of paring engines. The parsing engines are also able to perform information refinement in accordance with selected components defined in a target output data model.

18 Claims, 6 Drawing Sheets

U.S. PATENT DOCUMENTS

| | | |
|---|---|---|
| 2002/0188497 A1* | 12/2002 | Cerwin ............................ 705/10 |
| 2003/0185220 A1* | 10/2003 | Valenci ......................... 370/398 |
| 2004/0059744 A1 | 3/2004 | Duncan et al. |
| 2004/0088425 A1* | 5/2004 | Rubinstein et al. ........... 709/230 |
| 2004/0093215 A1* | 5/2004 | Gupta et al. .................. 704/270 |
| 2004/0153447 A1 | 8/2004 | Hiratsuka et al. |
| 2004/0164961 A1* | 8/2004 | Bal et al. ....................... 345/163 |
| 2004/0242202 A1* | 12/2004 | Torvinen ..................... 455/412.1 |
| 2005/0028080 A1 | 2/2005 | Challenger et al. |
| 2005/0192955 A1 | 9/2005 | Farrell |
| 2006/0117005 A1 | 6/2006 | Stewart et al. |
| 2006/0117307 A1* | 6/2006 | Averbuch et al. ............. 717/143 |
| 2006/0168515 A1* | 7/2006 | Dorsett et al. ................ 715/513 |
| 2006/0287890 A1* | 12/2006 | Stead et al. ........................ 705/3 |
| 2010/0153490 A1* | 6/2010 | Durham ........................ 709/203 |

* cited by examiner

METHODS AND SYSTEMS FOR HIGH THROUGHPUT INFORMATION REFINEMENT

CROSS-REFERENCE TO RELATED APPLICATIONS

This Application is related to the following U.S. Patent Applications, which are filed concurrently with this Application, and which are incorporated herein by reference to the extent permitted by law:

Ser. No. 11/080,085, entitled "METHODS AND SYSTEMS FOR CACHING AN INFORMATION MODEL NODE;"

Ser. No. 11/080,893, entitled "METHODS AND SYSTEMS FOR IDENTIFYING ASSOCIATIONS BETWEEN INFORMATION MODEL NODES;"

Ser. No. 11/080,894, entitled "METHODS AND SYSTEMS FOR PROVIDING SYNCHRONOUS NOTIFICATION OF INCOMING DATA TO A BUSINESS LOGIC TIER;"

Ser. No. 11/080,831, entitled "METHODS AND SYSTEMS FOR DYNAMICALLY ALLOCATING INFORMATION REFINEMENT RESOURCES;" and Ser. No. 11/080,896, entitled "METHODS AND SYSTEMS FOR DYNAMICALLY GENERATING A NEW NODE IN AN INFORMATION MODEL."

FIELD OF THE INVENTION

The present invention relates to methods and systems for managing data in a data processing system, and in particular, to methods and systems for high-throughput information refinement.

BACKGROUND OF THE INVENTION

A data processing system uses a business application connected to a data network to receive and process data from a number of endpoint data sources. The business application processes the data in accordance with specific business functions. Examples of business applications for such data processing systems include service automation systems and telephone service provisioning systems.

Business applications in data processing systems must often process very large amounts of data, which is made more difficult in applications in which the data cannot be stopped. In a service automation system, an enterprise, such as a computer manufacturer, may collect data from its customers to keep track of the quality of its products, maintenance needs, service requirements, hardware and software configurations, patch history, and any other item of information that the enterprise may wish to track. The data, also known as "telemetry," is typically text-based and formatted, and depending on the complexity of the specific data, it may be quite voluminous. Computer manufacturers may also have so many products in the field that their service automation systems could be receiving telemetry constantly. Similarly, a telephone provisioning system may receive requests for services, requests for ringtones, requests for pictures, data describing a user, data describing a handset, or data in many forms at virtually any time.

When the data is received, the data typically goes through a parsing phase to convert the text-based nature of the data into an operational data model of the application. Each data processing system may employ its own parsing and data model. Each system may also implement input data models that define the structure of the text data and output data models, which define the operational format of the data as required by the business application.

Traditionally, the input data models and output data models are defined at compile-time. This causes problems that are based on the very nature of the data typically processed by data processing systems. The data of interest evolves in content and in format. The format of the data changes as new information is sought by or presented to the business applications. Many data processing systems must necessarily deal with multiple data formats as it is. For example, a computer manufacturer makes different models of computers based on the different operating systems they run. Each model may present data to the service automation system in a different format.

In addition, input data models and output data models tend to grow in size. As the models grow in size, the differences between the input data models and the output data models grow exponentially requiring increasingly sophisticated and complex parsers.

The increasing complexity of data processing systems is aggravated as increasing load leads to a lack of scalability in the system. This is typically addressed by fragmenting the business application into separate solutions that map to divisions with the overall data model. In many applications, such as service automation systems, most of the information has significant associations. Maintenance of these associations is essential to be able to derive new information about the customer's environment. In addition, the typical solution may cause significant duplication and ultimately siloing of technologies.

In view of the above, a need has long existed for a method and a system that overcome the problems noted above and others previously experienced.

SUMMARY OF THE INVENTION

In accordance with methods consistent with the present invention, a method in a data processing system is provided. The method operates in a data processing system having a program and in the method a data message comprising a data type and a payload is received. The data message is re-formatted as classified data comprising an identifier, the data type and the payload. A message service queue is selected from a plurality of message service queues according to the data type. The re-formatted message is sent to the selected message service queue. The re-formatted message is then selected from the selected message service queue and parsed to generate an output data set.

In accordance with articles of manufacture consistent with the present invention, a computer-readable medium containing instructions for controlling a data processing system to perform a method is provided. The computer-readable medium contains instructions that cause a data processing system having a program to perform a method comprising: receiving a data message comprising a data type and a payload; re-formatting the data message as classified data comprising an identifier, the data type and the payload; selecting a message service queue from a plurality of message service queues according to the data type; sending the re-formatted message to the selected message service queue; selecting the re-formatted message from the selected message service queue; and parsing the re-formatted message to generate an output data set.

In accordance with systems consistent with the present invention, a data processing system is provided. The data processing system comprises a business application running on a central processing unit in the data processing system, the business application communicating via a data network. The data processing system comprises a plurality of client data sources, each running on corresponding processors of corresponding computer systems. Each client data source communicates with the business application over the data network by sending a plurality of data messages to the business service application. A message preprocessor receives a data message, extracts a data type and a payload from the data message, re-formats the message to include an identifier, and publishes the re-formatted message. A message service cluster comprising a plurality of message service queues receives the re-formatted according to the data type. A parsing processor runs on the data processing system and receives the re-formatted data message from one of the message service queues. The parsing processor generates an output data set of data extracted from the re-formatted data message.

Other systems, methods, features, and advantages of the invention will become apparent to one having skill in the art upon examination of the following figures and detailed description. It is intended that all such additional systems, methods, features, and advantages be included within this description, be within the scope of the invention, and be protected by the accompanying drawings.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

DETAILED DESCRIPTION OF THE INVENTION

Figure 1:
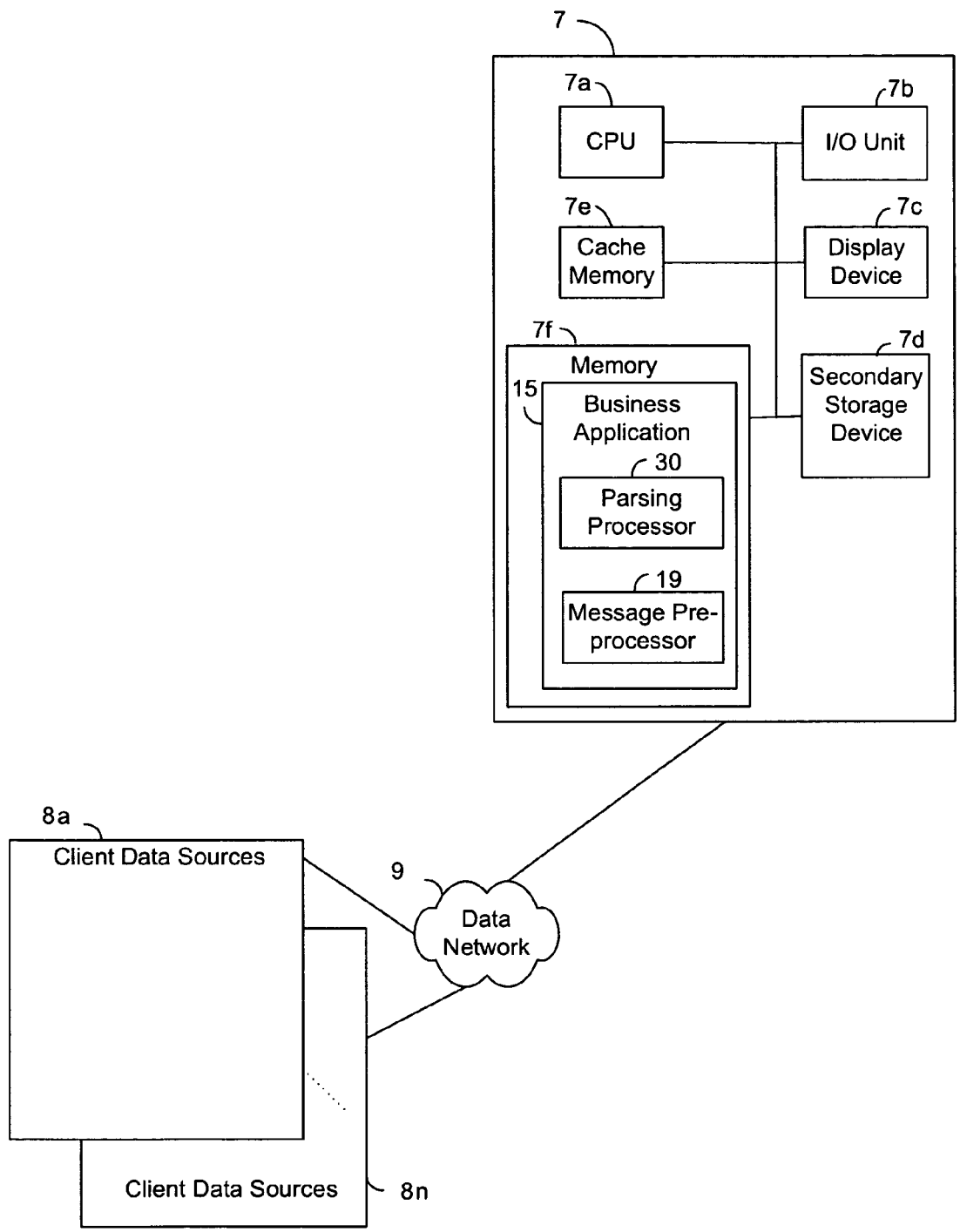
FIG. 1 depicts a block diagram of an exemplary data processing system in accordance with methods and systems consistent with the present invention.

References will now be made in detail to an implementation consistent with the present invention as illustrated in the accompanying drawings. Wherever possible, the same reference numbers will be used throughout the drawings and the following description to refer to the same or like parts FIG. 1 depicts a block diagram of a data processing system suitable for use with methods and systems consistent with the present invention. The data processing system comprises a computer system 7 and a business application 15 connected to a data network 9. The business application 15 is communicatively connected via the computer system 7 to a plurality of client data sources 8a-8n across the data network 9. The network 9 may be any known private or public communication network, such as a local area network ("LAN"), WAN, Peer-to-Peer, or the Internet, using standard communications protocols. The network 9 may include hardwired as well as wireless branches.

The computer system 7 has a central processing unit (CPU) 7a, an input/output (I/O) unit 7b, a display device 7c, a secondary storage device 7d, a cache memory 7e, and a memory 7f. The computer system may further comprise standard input devices such as a keyboard, a mouse or a speech processing means (each not illustrated). The business application 15 resides in the memory 7f of the computer system 7.

Client data sources 8a-8n may be computers that are similar to the system on which the business application 15 operates. In typical implementations, the client data sources 8a-8n are general-purpose computer systems such as IBM compatibles, Apple Macintosh systems, or other equivalent computer.

The business application 15 may be any type of application that may operate on a data processing system. Applications that operate particularly advantageously include those that process data received from a large number of data sources in very high volume. The business application 15 in FIG. 1 comprises a message pre-processor 19 and a parsing processor 30 to transform incoming data messages, which may be in many different data formats as data that conforms to a normalized data model.

The message pre-processor 19 receives data messages from the client data sources 8a-8n and synchronously parses out key identifying information and classifies the data in the message accordingly. The message pre-processor 19 may receive data in many different formats. In an exemplary embodiment, the message pre-processor 19 sends the classified data messages to one or more selected queues that the message pre-processor 19 selects according to its classification.

The queues feed the classified data to be parsed by parsing engines in the parsing processor 30. The parsing processor 30 performs the function of extracting the data from the data messages by applying a target data model according to the data needs of the data consumers. The combined effect of the message pre-processor 19 and the parsing processor 30 is that a normalized data set is provided to the business application consumers even as the format of the data messages evolves over time. In addition, the data processing system is highly scalable without modification to the data messages that arrive from the client data sources 8a-8n—and thereby requiring a software change at the client data source 8a-8n. In exemplary embodiments, the data processing system is scalable and adaptable in run-time precluding the need to bring down the system in order to handle new data formats.

One example of a business application 15 is a service automation system that an enterprise may use to receive data from its customers. Other business applications 15 that may find advantageous use in exemplary embodiments include telephone service provisioning systems, automatic bank teller networks, automobile service information systems, and insurance claims processing systems. The following description of exemplary embodiments uses a service automation system for a computer manufacturer as an example of the business application 15. One of ordinary skill in the art will appreciate that the present invention is not limited to any specific application.

The business application 15 may reside in the memory of one or more computers, preferably a Sun® SPARC® computer system running the Solaris® operating system. The business application 15 may also reside in one or more servers (which may also be Sun®SPARC® computer systems) and be accessible to other computer systems over the data network 9. The business application 15 and its components described below are preferably developed in Java. One of ordinary skill in the art will appreciate that devices, programs, and programming languages other than those described in the illustrative examples can be implemented. Sun, Java, and Solaris and are trademarks or registered trademarks of Sun Microsystems, Inc., Palo Alto, Calif., in the United States and other countries. SPARC is a registered trademark of SPARC International, Inc., in the United States and other countries. Other names may be trademarks or registered trademarks of their respective owners.

One having skill in the art will appreciate that the programs described herein, such as the business applications, the message pre-processor, and the parsing processor, may each be stand-alone programs residing in memory on one or more data processing systems other than the illustrative systems. The programs may each comprise or may be included in one or more code sections containing instructions for performing their respective operations. While the programs are described as being implemented as software, the present implementation may be implemented as a combination of hardware and software or hardware alone. Also, one having skill in the art will appreciate that the programs may comprise or may be included in a data processing device, which may be a client or a server, communicating with the illustrative systems.

Although aspects of methods, systems, and articles of manufacture consistent with the present invention are described as being stored in memory, one having skill in the art will appreciate that these aspects may be stored on or read from other computer-readable media, such as secondary storage devices, like hard disks, floppy disks, and CD-ROM; a carrier wave received from a network such as the Internet; or other forms of ROM or RAM either currently known or later developed. Further, although specific components of the data processing system 5 have been described, one skilled in the art will appreciate that a data processing system suitable for use with methods, systems, and articles of manufacture consistent with the present invention may contain additional or different components.

Figure 2:
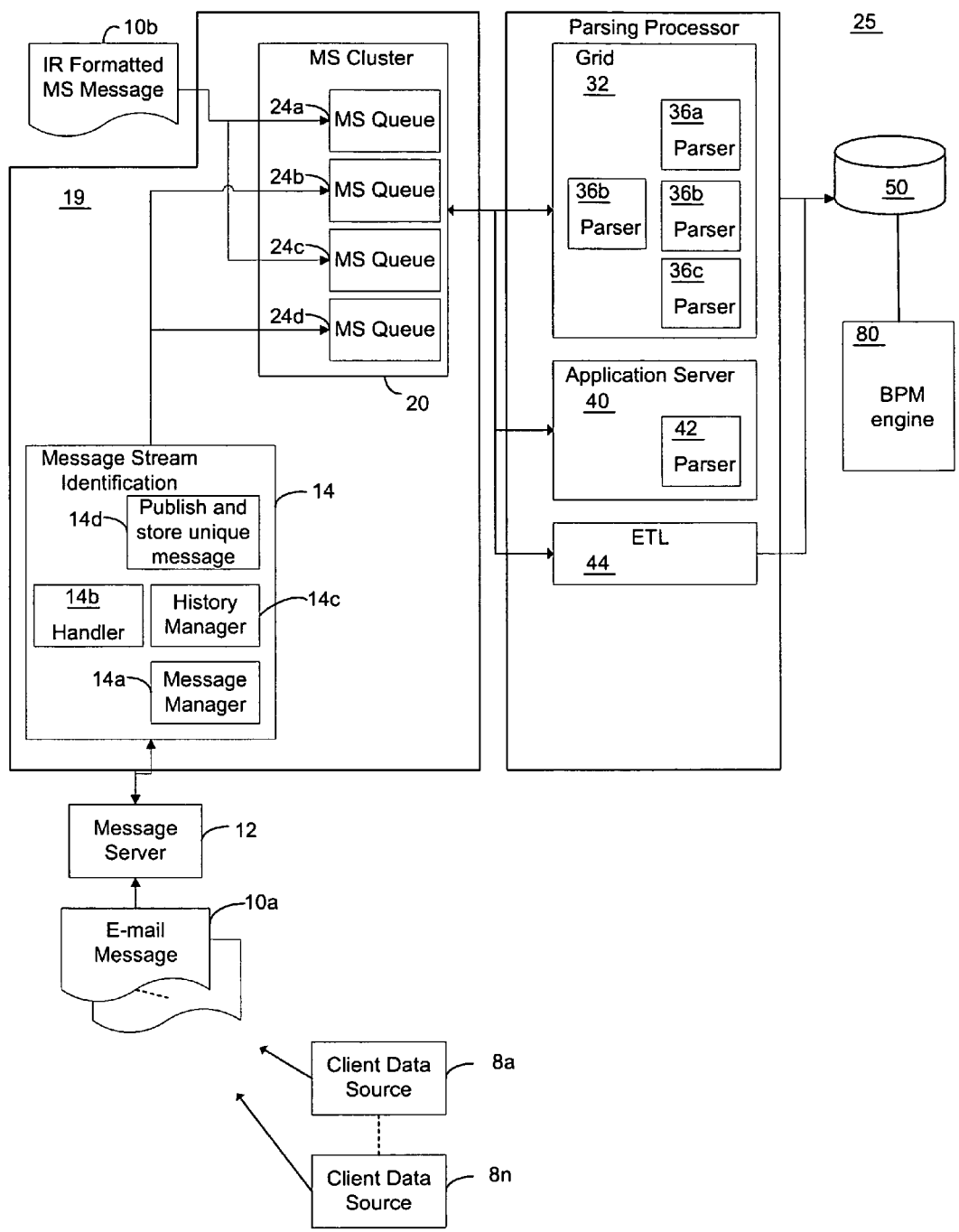
FIG. 2 depicts a block diagram of an exemplary embodiment of the data processing system of FIG. 1.

FIG. 2 depicts a block diagram of a data processing system 25 suitable for use with exemplary embodiments of methods and systems of the present invention. The data processing system 25 in FIG. 2 is a service automation system used by a computer manufacturer to collect data relating to the products purchased by its customers. The computer manufacturer may sell both hardware and software and may use the service automation system to retrieve data automatically generated by products purchased by its customers, which are shown in FIG. 2 as client data sources 8a-8n. The client data sources 8a-8n are computers that are either themselves products sold by the computer manufacturer, or operate software products made by the computer manufacturer.

The data processing system 25 may collect a wide variety of information from the client data sources 8a-8n. For example, the client data sources 8a-8n may prepare messages containing information about software patches, system configurations, storage systems, peripherals connected to the bus in the client data source computer, bug reports, or any other type of information that the computer manufacturer would find useful. A configuration file is a type of data message that many computer systems generate to provide the information that describes particular computer systems. Table 1 below identifies an illustrative format of the structured data that a configuration file may contain to describe a computer system.

TABLE 1

| Category | Element Name | Sub-Element Name | Description | Data Type with delimiter (e.g., ";") to separate multiple entries |
|---|---|---|---|---|
| Hardware | Computer System | | Model number and configuration version for the computer system | String delimiter string |
| | Motherboard | | Model number of motherboard version in the computer system | String |
| | | CPU | Model numbers of compatible CPU | String |
| | | RAM | Type and size of compatible random access memory. | String |
| | Video card | | Model numbers of compatible video card | String |
| | Modem | | Model numbers of compatible modem | String |
| | Harddrive controller | | Model numbers of compatible harddrive controller | String |
| | Harddrive | | Model numbers of compatible harddrive | String |
| | CD/DVD controller | | Model numbers of compatible controllers | String |
| | Display | | Model numbers of compatible displays | String |
| Software | Motherboard Firmware | | Filename/version | String delimiter string |
| | Operating System (OS) | | Filename/version | String delimiter string |

The client data sources 8a-8n are capable of sending information (such as configuration files) about the computer manufacturer's products to the data processing system 25 over the data network 9. FIG. 2 shows two ways in which data may be sent to the data processing system 25. One way is via an email message 10a. The other way is via a specially formatted message 10b.

The email message 10a arrives at a message server 12 in the network environment of the data processing system 25. The message server 12, preferably a S1MS (Sun One Message Store), delivers the email message 10a to a stream identification server 14 over a connector. The stream identification server 14 processes attachments, such as attachments according to the Multi-purpose Internet Mail Extension ("MIME") standard and maps incoming data to message types. The stream identification server 14 comprises a message manager 14a, a handler factory 14b, a history manager 14c, and a message publisher/subscriber 14d.

The message manager 14a is preferably implemented as, but not limited to, a Message Driven Bean (EJB 2.1). When the message manager 14a receives a new data message, it invokes the handler factory 14b, which searches for a handler for the data type associated with the new message. The new message is also assigned a unique key. The history manager 14c keeps a record of all of the keys for the data messages that have been processed. If the history manager 14c determines that the unique key of the data message does not belong to a message that has already been processed, handler 14b for the data message creates a new message having an identifier (ID) in a header and a payload (or the data portion of the email). The message publisher/subscriber 14d then communicates the new message to a message service cluster 20.

The message service cluster 20 comprises a plurality of message service queues 24a-24d. Each message service queue 24a-24d processes the new messages published by the stream identification server 14 based on the data type of the message. Examples of data types for email messages in the exemplary service automation system described herein include a configuration file, a patch list, a storage identification file, a performance record, a maintenance record, a bug list, an installed driver list, an installed software list, and a license information record. These are just a few examples of data types. A service automation system may be required to process hundreds of such data types. A MS queue 24a-24d may be implemented to handle each one.

The message service queues 24a-24d in the message service cluster 20 provide an asynchronous dispatch to the parsing processor 30. The parsing processor 30 may retrieve message service messages by selecting a queue, and parsing the message in accordance with a target output data model. The parsing processor 30 comprises a grid parser 32, which uses multiple parsers 36a-c for messages that are very computational and resource intensive. In an exemplary embodiment, the parsing processor 30 contains a plurality of parsers 32, 40, 44, each operable to parse data messages according to the data type and other factors that optimize the efficiency and performance of the parsing function. The parsing processor 30 advantageously allows a data consumer of the business application to obtain data extracted according to specific needs.

The parsing processor 30 outputs parsed data to one or more repositories 50, where a business process management engine 80, or a consumer of the data collected.

Figure 3:
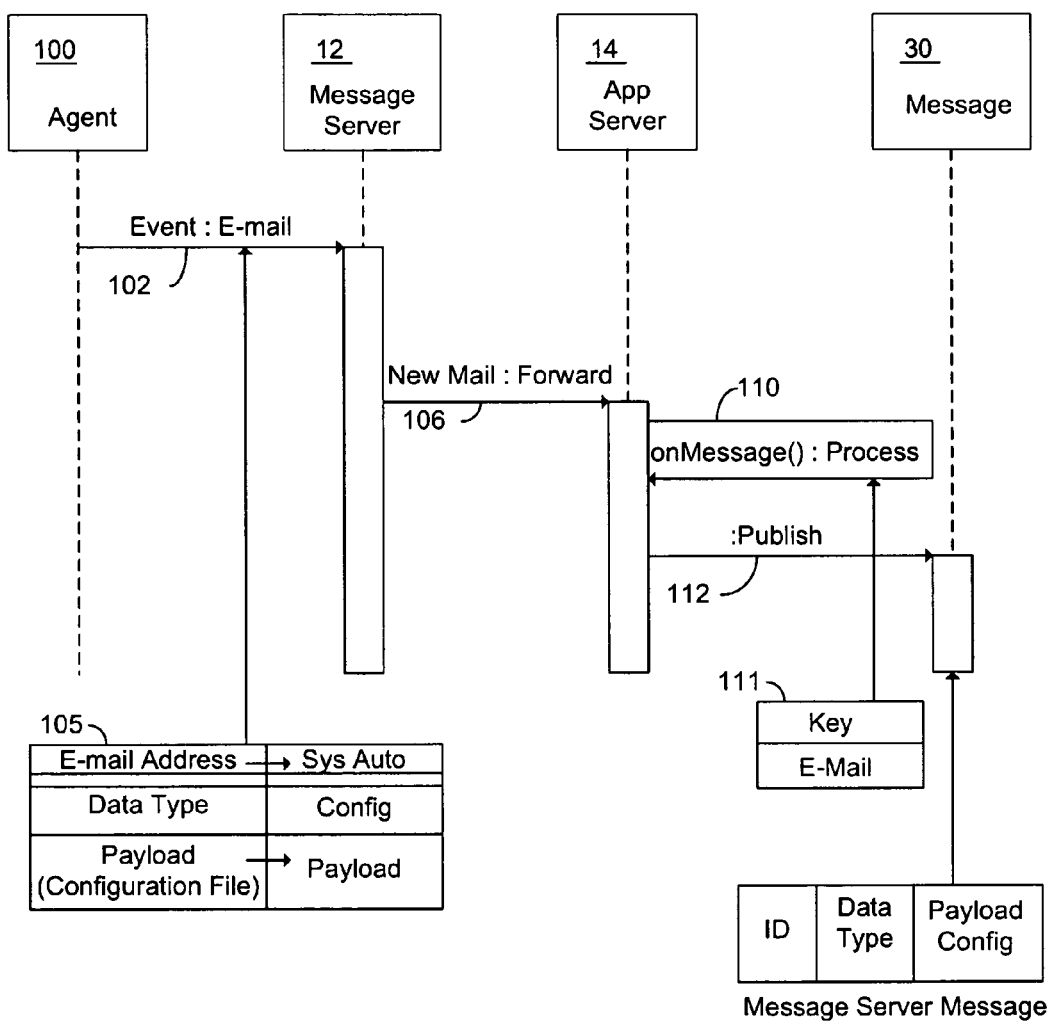
FIG. 3 depicts a message flow diagram illustrating an exemplary embodiment of a data message identification.

FIG. 3 is a message sequence diagram that shows the flow of an email as it is processed by the message pre-processor 19 in FIG. 2. The email is first sent by an agent 100 from one of the client data sources 8a-8n and an email event 102 to the mail server 12. An email example 105 shows the email has an email address, a data type and a payload. The mail server 12 identifies the email address on the email and sends the email as New Mail 106 to the stream identification server 14. The stream identification server 14 adds a key to the email 111 to determine if the message has been processed before. If it has not, the stream identification server 14 processes the message and publishes the message to the message queue cluster 20. An example of a message service message 120, illustrated in FIG. 3, shows the message as now being a data structure with an identifier ("ID"), the data type, and the data payload. One advantage of the message pre-processor 19 is that it receives data formatted in many different ways and re-formats the messages uniformly so that the parsing processor 30 may use the messages efficiently.

Figure 4:
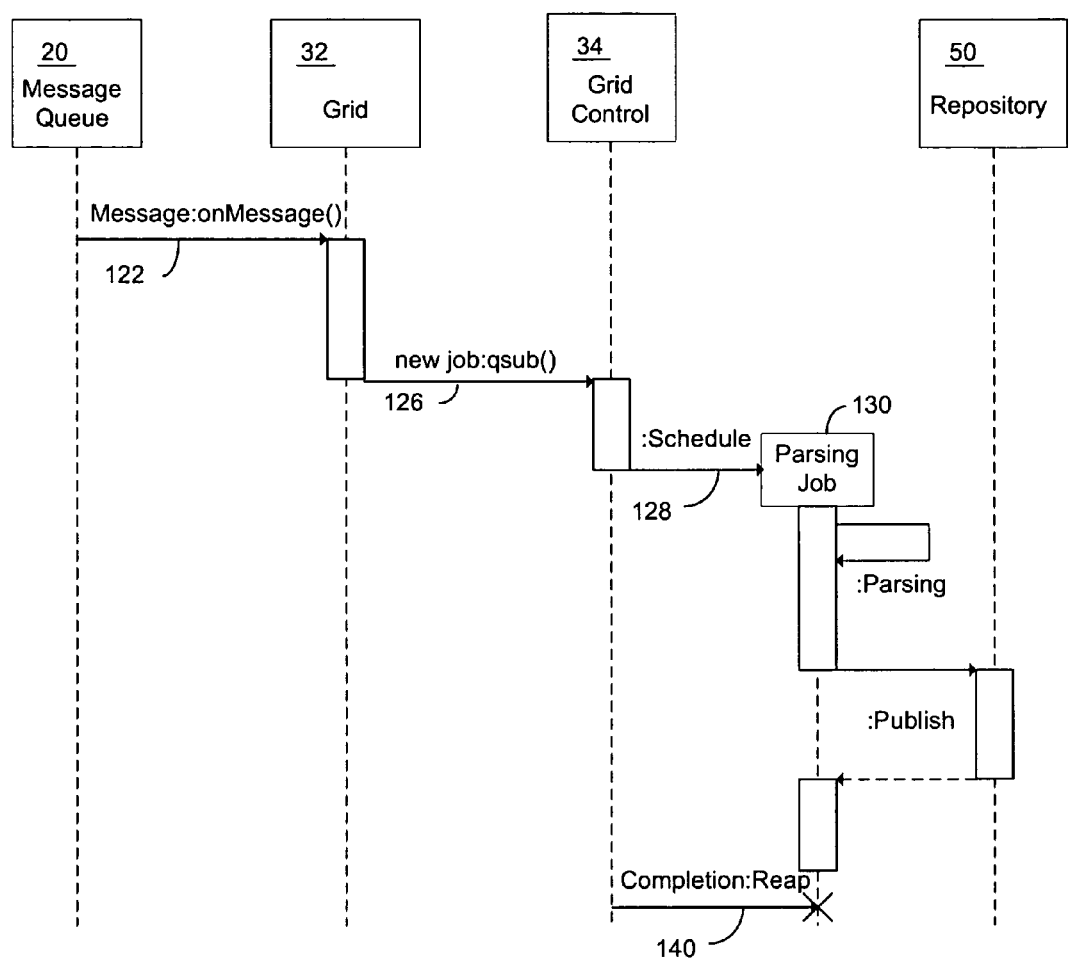
FIG. 4 depicts a message flow diagram illustrating an exemplary parsing of a data message employing a grid model.

One of the parsers that may be used in the parser processor 30 is a grid parser 32. FIG. 4 illustrates the message flow as the grid parser 32 parses a message from the message queue 20. The parsing processor 30 receives the message 122 and forwards the message to the grid parser 32. The grid parser 32 may perform any necessary pre-processing before starting a parsing job 126. For example, the grid parser 32 may have to adapt the message by removing extraneous and implementation-specific data from the message. The grid parser 32 then starts a new parsing job 126 under the control of a grid controller 34. The grid controller 34, preferably the Sun Grid Engine (SGE), schedules (at 128) a parsing job 130 and distributes jobs to different parsers 36a-c (in FIG. 2). Then the parsing job 130 is executed, the resulting output data set is published to the repository 50.

As discussed above, the parsing processor 30 may select the grid parser 32 for computationally intensive messages. In a preferred embodiment, the parsing processor 30 may select from several parsing engines depending on characteristics of the data message. The ability to select parsing engines optimizes the parsing processor 30. Parsers are traditionally bound to data types at compile time and resources are typically planned for the highest possible load. In a remote services environment, planning for the highest possible load means over-provisioning. Moreover, dynamic allocation of parsing engines improves throughput by ensuring that the data is parsed using a parsing engine that is best suited for the particular data message.

Figure 5:
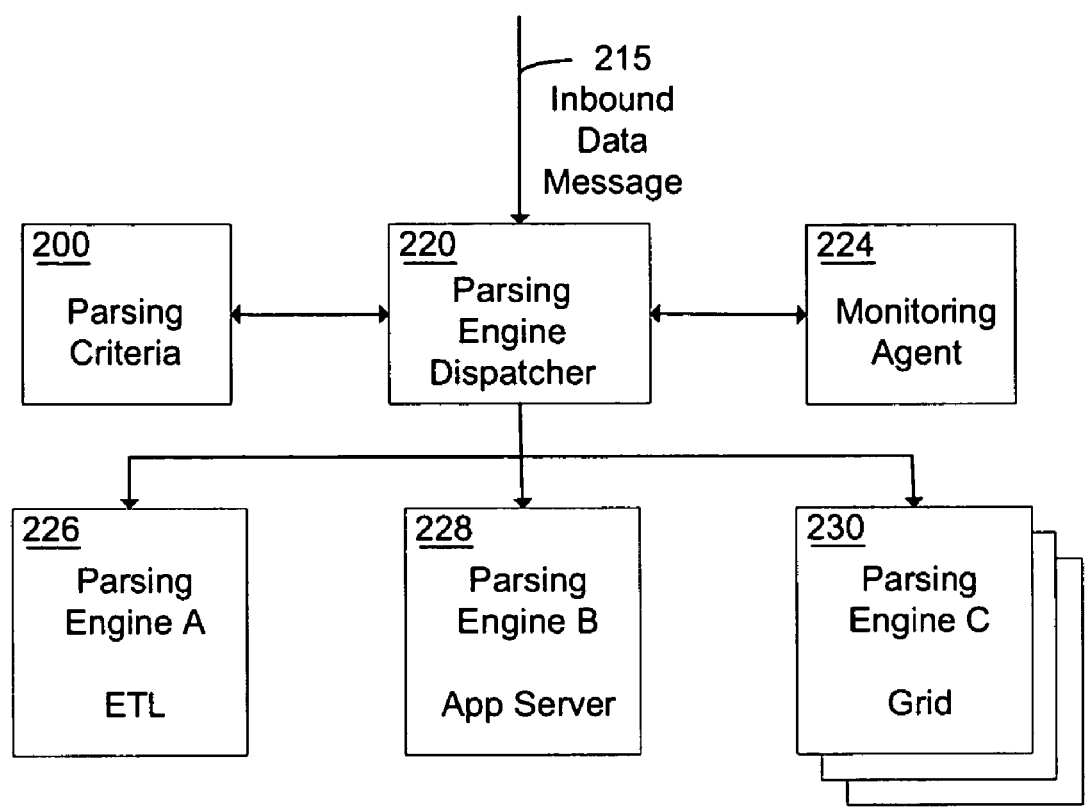
FIG. 5 depicts a block diagram of an exemplary parsing system for dynamically allocating a parsing engine that may be employed in the data processing system.

FIG. 5 shows a block diagram of a dynamic parser allocation scheme in which a parsing engine dispatcher 220 receives the inbound data message 215. The inbound data message 215 may be from any one of the message queues 24a-24d in the message queue cluster 20. The parsing processor 30 selects a queue to obtain the inbound data message 215, preferably using a monitoring agent 224 to monitor each queue and ensure that the queues don't overflow. The parsing engine dispatcher 220 retrieves a set of parsing rules from a parsing criteria database 200. The set of parsing rules allow the parsing engine dispatcher 220 to heuristically learn information about the data message 215 and to select the best parsing engine based on the information. As shown in FIG. 5, the parsing engine dispatcher 220 may select an Extract-Transform-Load ("ETL")-based parsing engine 226, an application server-based engine 228, or a grid parsing engine 230. Other types of parsing engines that may be selected include a Practical Extraction and Report Language ("PERL")-based engine, a Shell-based engine, a JAVA-based engine, a ETL-based engine, and a Python-based engine.

When the parsing engine dispatcher 220 receives the inbound data message, it retrieves the parsing rules and determines information about the data message to apply to the parsing rules. For example, the inbound data message 215 may be a configuration file. Configuration files vary in their structure and complexity depending on the source of the file. Configuration files for Windows-based computers tend to be highly structured. If information refinement is being applied to this data, a fast parser such as an XML parser (e.g. XPATH) could be used.

Configuration files generated by Linux systems on the other hand are largely unformatted as they use comma-separated data fields. Such configuration files would tend to be more resource intensive making a grid parser the best choice.

Table 2 shows examples of parsing rules that may be implemented in exemplary embodiments of dynamic parser allocation schemes.

TABLE 2

Example Parsing Rules

IF CONFIG file format = PERL,
then Perl-based parser engine.
IF CONFIG file format = CSV,
then set flag = UNFORMATTED, goto check volume.
CHECK-VOLUME: IF data volume HIGH, then Grid Parser.

Figure 6:
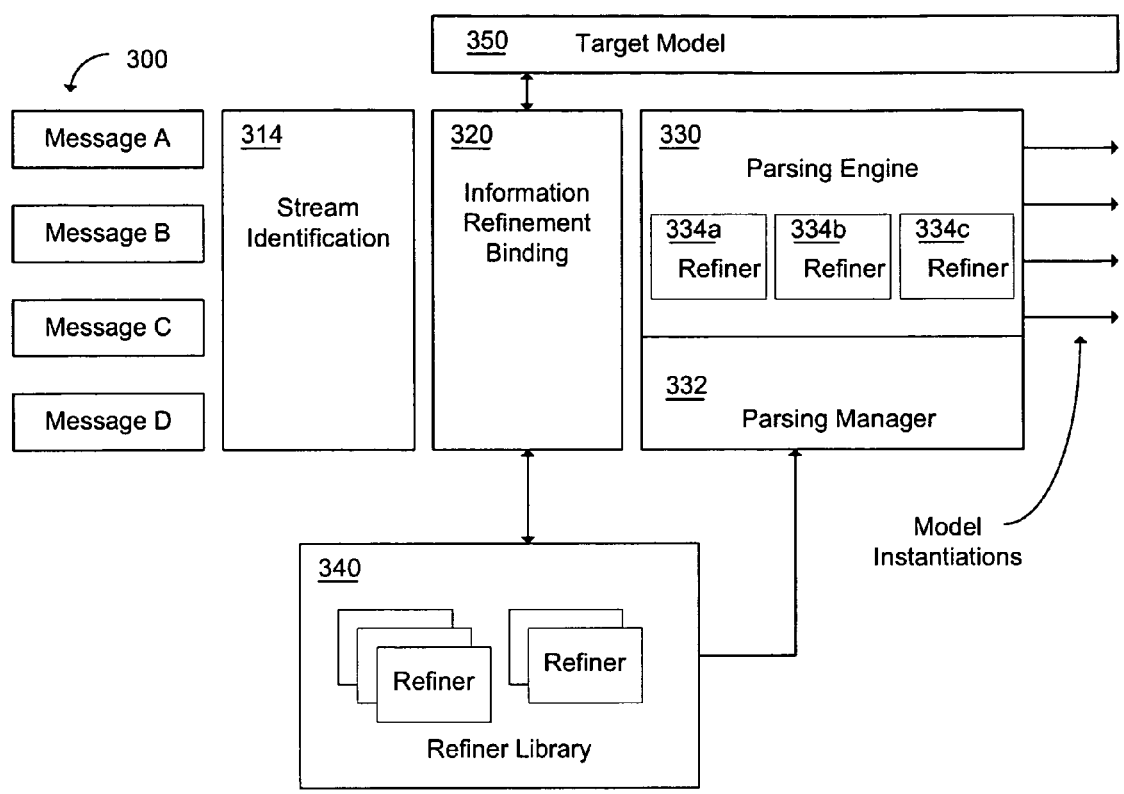
FIG. 6 depicts a block diagram of an exemplary information refinement system that may be employed in the data processing system.

Data consumers do not often need all of the information contained in data messages. For example, an application may be interested in the capacities of the systems, such as the processor speeds and/or storage capacities. Exemplary embodiments of the present invention enhance throughput by controlling the parser to extract only the information of interest. FIG. 6 depicts operation of a parsing engine 330 that uses information refiners 334a-334c to extract only selected information and to configure an output having only the selected information.

In FIG. 6, a plurality of messages 300 is pre-processed by the stream identification server 314 to yield messages that are sent to one of the message queues 24a-d in the message queue cluster 20. A selected message is received at the parsing processor 30 and processed by an information refinement binding function 320. The information refinement binding function 320 retrieves a target output data model 350 to define the information of interest for a particular data consumer. The information refinement binding function uses the target output model to select refiners from a refiner library 340. A refiner is a set of programming constructs (e.g. program logic, data structure, etc.) that defines which information should be extracted from the message 330.

The target output model 350 contains components that define the data of interest in the data message. For example, for a configuration file, a target output model may be designed to extract information about the capacity of a computer system. In such a model, the components of interest may include:
  processor speed
  hard disk storage capacity
  RAM capacity
  Bus speed Based on these components, one or more refiners may be selected from the refiner library to extract the desired information from the data message.

Once the refiners are selected, the parsing engine 330 binds the selected refiners 334a-c to the data message. The binding of the refiners to the data message results in instantiation of the output data according to the target output model.

The foregoing description of an implementation of the invention has been presented for purposes of illustration and description. It is not exhaustive and does not limit the invention to the precise form disclosed. Modifications and variations are possible in light of the above teachings or may be acquired from practicing the invention. For example, the described implementation includes software but the present implementation may be implemented as a combination of hardware and software or hardware alone. The invention may be implemented with both object-oriented and non-object-oriented programming systems. The scope of the invention is defined by the claims and their equivalents.

What is claimed is:

1. A method for processing messages, the method comprising the steps of:
  a computer system:
    receiving, from a plurality of different data sources in a data network, a plurality of data messages each having a data type associated therewith and comprising a payload, wherein the plurality of data messages comprises different data formats;
    for each of the data messages, determining a classification of the data message by parsing out information identifying the data type;
    re-formatting each of the data messages, each of the re-formatted messages having a uniform data structure comprising an identifier, the classification, and the payload;
    selecting a message service queue for each of the reformatted messages from a plurality of message service queues each dedicated to storing messages of a particular data type according to the classifications of the reformatted messages such that each of the selected service queues store a subset of the reformatted messages of a single data type;
    with a parsing processor, monitoring the plurality of message service queues; and
    with a parsing processor, selecting one of the message service queues based on the monitoring and then retrieving and parsing a next one of the reformatted messages from the selected one of the message service queues in accordance with a target output data model,
    wherein the parsing processor comprises a plurality of parsers each operable to parse data messages having a different data type and wherein the parsing processor parses the next one of the reformatted messages using one of the plurality of parsers that is configured for parsing the data type associated with the selected service queue and is dynamically selected and allocated during the parsing step,
    wherein the parsing processor, during the parsing step, selects one of the parsers to use for parsing the next one of the reformatted messages based on the data type and at least one parsing rule applied to one or more characteristics of the next one of the reformatted messages and wherein the plurality of parsers includes at least two parsers adapted for parsing the data type associated with the selected service queue, and
    wherein the parsing includes extracting a subset of information in the payload of the next one of the reformatted messages defined in the target output data model, whereby throughput of the parsing processor is enhanced by extracting only select information from each of the data messages.

2. The method of claim 1 further comprising the steps of:
  the computer system:
    inserting a unique key in the data message;
    searching for the unique key in a history of processed keys; and
    if the unique key is not found in the history of processed keys, adding the unique key to the history of processed keys.

3. The method of claim 1 wherein the step of receiving the data message comprises the steps of:
  the computer system:
    receiving an email message from a message server; and
    processing the email message by extracting the data type and the payload.

4. A non-transitory computer-readable storage device having a program code embodied therein to perform a method for processing messages, the method comprising the steps of:
  a computer system:
    receiving, from a plurality of different data sources in a data network, a plurality of data messages each having a data type associated therewith and comprising a payload, wherein the plurality of data messages comprises different data formats;
    for each of the data messages, determining a classification of the data message by parsing out information identifying the data type;
    re-formatting each of the data messages, each of the re-formatted messages having a uniform data structure comprising an identifier, the classification, and the payload;
    selecting a message service queue for each of the reformatted messages from a plurality of message service queues each dedicated to storing messages of a particular type according to the classifications of the reformatted messages such that each of the selected service queues store a subset of the reformatted messages of a single type;

with a parsing processor, monitoring the plurality of message service queues; and with a parsing processor, selecting a next one of the message service queues to service based on the monitoring, receiving a next one of the reformatted messages from the selected one of the message service queues, and parsing the next one of the reformatted messages in accordance with a target output data model using one of a plurality of parsers selected by the parsing processor, after the receiving, using characteristics of the data message, wherein the parsing processor comprises a plurality of parsers each operable to parse data messages having a different data type and wherein the parsing processor parses the next one of the reformatted messages using one of the plurality of parsers that is configured for parsing the data type associated with the selected service queue and is dynamically selected and allocated during the parsing step, wherein the parsing processor selects one of the parsers to use for parsing the next one of the reformatted messages based on the data type and at least one parsing rule applied to one or more characteristics of the next one of the reformatted messages and wherein the plurality of parsers includes at least two parsers adapted for parsing the data type associated with the selected service queue, and wherein the parsing processor extracts a subset of information in the payload of the next one of the reformatted messages defined in the target output data model, whereby throughput of the parsing processor is enhanced by extracting only select information from each of the data messages.

5. The non-transitory computer-readable storage device in claim 4 wherein the method further comprises the steps of:
the computer system:
inserting a unique key in the data message;
searching for the unique key in a history of processed keys; and
if the unique key is not found in the history of processed keys, adding the unique key to the history of processed keys.

6. The non-transitory computer-readable storage device in claim 5 wherein the step of receiving the data message in the method comprises the steps of:
receiving an email message from a message server; and
processing the email message by extracting the data type and the payload.

7. A computer system comprising:
a central processing unit and a memory;
a receiving unit for receiving, from a plurality of different data sources in a data network a plurality of data messages each having a data type associated therewith and comprising a payload, wherein the plurality of data messages comprises different data formats;
an identification unit for determining a classification of each of the data messages by parsing out information identifying the data type;
a formatting unit for re-formatting each of the data messages, wherein each of the re-formatted massages comprises an identifier, the classification, and the payload;
a selecting unit for selecting, based on the data type, a message service queue for each of the reformatted messages from a plurality of message service queues from the memory each adapted to process messages having differing data types such that each of the selected service queues store a subset of the reformatted messages of a single data type;
monitoring the plurality of message service queues; and
a parsing processor executed by the central processing unit that retrieves the reformatted message and parses the retrieved message using one of a plurality of parsers operable to parse data messages according to data types, wherein the parsing processor selects the one of the parsers based on the monitoring and based on the classification of the retrieved message and another characteristic of the retrieved message determined from the message payload, wherein the parsing processor comprises a plurality of parsers each operable to parse data messages having a different data type and wherein the parsing processor parses the next one of the reformatted messages using one of the plurality of parsers that is configured for parsing the data type associated with the selected service queue and is dynamically selected and allocated during the parsing step, wherein the parsing processor selects one of the parsers to use for parsing the next one of the reformatted messages based on the data type and at least one parsing rule applied to one or more characteristics of the next one of the reformatted messages and wherein the plurality of parsers includes at least two parsers adapted for parsing the data type associated with the selected service queue, and wherein the parsing processor extracts a subset of information in the payload of the next one of the reformatted messages defined in the target output data model, whereby throughput of the parsing processor is enhanced by extracting only select information from each of the data messages.

8. The computer system of claim 7 further comprising:
a first key unit for inserting a unique key in the data message;
a second key unit for searching for the unique key in a history of processed keys; and
a third key unit for adding the unique key to the history of processed keys, if the unique key is not found in the history of processed keys.

9. The computer system of claim 7 wherein the receiving unit for receiving the data message comprises:
a first email unit for receiving an email message from a message server; and
a second email unit for processing the email message by extracting the data type and the payload.

10. The method of claim 1, wherein the data message is an email message and the data type is one of the following data types: a configuration file, a patch list, a storage identification file, a performance record, a maintenance record, a bug list, an installed driver list, an installed software list, and a license information record.

11. The non-transitory computer-readable storage device of claim 4, wherein each of the message service queues process reformatted messages based on a data type associated with the reformatted messages, whereby each of the message service queues stores a differing data type.

12. The non-transitory computer-readable storage device of claim 4, wherein each of the parsers is operable to parse a particular data type and wherein the characteristics of the data message used to select the one of the parsers include the identified data type of the received data message and at least one characteristic of the payload identified in a set of parsing rules allowing the parsing processor to heuristically learn about the data messages, whereby the selected one of the parsers is operable to parse the identified data type.

13. The computer system of claim 7, wherein the data message is an email message and the data type is one of the following data types: a configuration file, a patch list, a storage identification file, a performance record, a maintenance record, a bug list, an installed driver list, an installed software list, and a license information record.

14. The method of claim 1, wherein the at least one parsing rule defines messages to process with a grid parser and wherein the plurality of parsers includes two or more grid parsers.

15. The method of claim 1, wherein the next one of the messages is a configuration file and the subset of information includes at least one of processor speed, hard disk storage capacity, random access memory capacity, and bus speed.

16. The computer system of claim 7, wherein the parsing processor further functions, during the retrieving, to dynamically select a next one of the message service queues from which to retrieve a message for parsing.

17. The computer system of claim 7, wherein the another characteristic is a programming language format for the message payload and the selected one of the parsers is a parser configured for parsing files with the programming language format.

18. The computer system of claim 7, wherein the another characteristic defines the message payload as unformatted and, when the payload is determined to be unformatted, the parsing processor chooses the selected one of the parsers based on a volume of data in the message payload.

* * * * *